United States Patent
Liu et al.

(10) Patent No.: US 8,761,073 B2
(45) Date of Patent: Jun. 24, 2014

(54) BASE STATION, RELAY STATION, AND BACKHAUL CONTROL COMMUNICATION METHODS THEREOF

(75) Inventors: Shu-Tsz Liu, Taipei (TW); Chih-Chiang Wu, Shalu Township (TW); Kenchei Loa, Taipei (TW); Chun-Yen Hsu, Minxiong Township (TW)

(73) Assignee: Institute For Information Industry, Taipei (TW)

( * ) Notice: Subject to any disclaimer, the term of this patent is extended or adjusted under 35 U.S.C. 154(b) by 312 days.

(21) Appl. No.: 12/821,777

(22) Filed: Jun. 23, 2010

(65) Prior Publication Data

US 2010/0322146 A1   Dec. 23, 2010

Related U.S. Application Data

(60) Provisional application No. 61/219,381, filed on Jun. 23, 2009, provisional application No. 61/240,694, filed on Sep. 9, 2009, provisional application No. 61/242,817, filed on Sep. 16, 2009, provisional application No. 61/259,646, filed on Nov. 10, 2009.

(51) Int. Cl.
*H04B 7/14* (2006.01)
*H04W 72/08* (2009.01)

(52) U.S. Cl.
CPC ................................ *H04W 72/087* (2013.01)
USPC ......................................................... 370/315

(58) Field of Classification Search
CPC ................................................. H04W 72/087
USPC ............................................................ 370/315
See application file for complete search history.

(56) References Cited

U.S. PATENT DOCUMENTS

| | | | |
|---|---|---|---|
| 7,933,236 B2* | 4/2011 | Wang et al. | 370/328 |
| 8,213,351 B2* | 7/2012 | Chiu et al. | 370/315 |
| 8,270,361 B2* | 9/2012 | Yi et al. | 370/329 |

(Continued)

FOREIGN PATENT DOCUMENTS

WO    WO 2008/002702 A2    1/2008

OTHER PUBLICATIONS

Extended European Search Report for the European counterpart application (10167072.7) to the present US application, Apr. 25, 2012; 8 pages.
Motorola: "Relay Design for LTE-A," 3GPP Draft, R1-091346; Mar. 18, 2009, 2 pages.

(Continued)

*Primary Examiner* — Ricky Ngo
*Assistant Examiner* — Ben H Liu
(74) *Attorney, Agent, or Firm* — Skaar Ulbrich Macari, P.A.

(57) ABSTRACT

A relay station and a backhaul control communication thereof are provided. A wireless communication system comprises the relay station, a base station, and a core network. The relay station is wirelessly connected to the base station, while the base station is wiredly connected to the core network. The relay station comprises a processing unit and a transceiver. The processing unit is configured to create a radio link having a control plane connection between the relay station and the base station and create a backhaul link between the relay station and the base station by the control plane connection of the radio link. The transceiver is configured to transmit a backhaul control message to the core network via the backhaul link.

24 Claims, 12 Drawing Sheets

(56) References Cited

U.S. PATENT DOCUMENTS

| | | | |
|---|---|---|---|
| 2007/0072604 A1* | 3/2007 | Wang | 455/428 |
| 2009/0196215 A1* | 8/2009 | Sabat et al. | 370/315 |
| 2009/0316617 A1* | 12/2009 | Ichinohe | 370/315 |
| 2010/0214972 A1* | 8/2010 | Che et al. | 370/315 |
| 2010/0265873 A1* | 10/2010 | Yi et al. | 370/315 |

OTHER PUBLICATIONS

Ericsson: "Termination of the S1/X2 interfaces in relay node," 3GPP Draft, R2-092953, Apr. 28, 2009, 4 pages.

Samsung: "Miscellaneous corrections and clarifications resulting from ASN.1 review [64_LTE_17]" 3GPP draft, Feb. 24, 2009, 184 pages.

* cited by examiner

BASE STATION, RELAY STATION, AND BACKHAUL CONTROL COMMUNICATION METHODS THEREOF

PRIORITY

This application claims the benefit of U.S. Provisional Application Ser. No. 61/219,381 filed on Jun. 23, 2009, U.S. Provisional Application Ser. No. 61/240,694 filed on Sep. 9, 2009, U.S. Provisional Application Ser. No. 61/242,817 filed on Sep. 16, 2009, and U.S. Provision Application Ser. No. 61/259,646 filed on Nov. 10, 2009. The disclosures of all of the preceding applications are hereby incorporated by reference herein.

FIELD

The present invention relates a base station, a relay station, and backhaul control communication methods thereof. More particularly, the base station, the relay station, and the backhaul control communication methods thereof of the present invention transmit backhaul control messages in the control plane connection of a radio channel.

BACKGROUND

Wireless communication technologies are widely used in nowadays. FIG. 1A illustrates the schematic view of a conventional wireless communication system 1. The wireless communication system 1 comprises a user equipment 11, a relay station 13, a base station 15, and a core network 17. The user equipment 11 is wirelessly connected to the relay station 13, the relay station 13 is wirelessly connected to the base station 15, and the base station 15 is wiredly connected to the core network 17.

The relay station 13 extends the serving coverage of the core network 17 so that a user equipment that is not in the coverage of the base station 15 but in the coverage of the relay station 13, such as the user equipment 11, can access the service provided by the core network 17. The relay station 13 has the functionalities that the base station 15 has, so the relay station 13 can transmit backhaul control messages to communicate with the core network 17. Conventionally, a backhaul control message is contained within a backhaul transport connection, e.g. Transmission Control Protocol (TCP)/Internet Protocol (IP), User Datagram Protocol (UDP)/Internet Protocol (IP) of the IEEE 802.16m standard, or Stream Control Transmission Protocol (SCTP)/IP of the Long Term Evolution (LTE) standard. It means that the relay station 13 has to create a user plane connection for IP connectivity and transmit or receive a backhaul control message within the user plane connection.

When the wireless communication system 1 conforms to the LTE standard, its protocol stacks are shown FIG. 1B. The protocol stacks 131, 151, and 171 respectively correspond to the relay station 13, the base station 15, and the core network 17. The relay station 13 and the base station 15 communicate with the core network 17 via the S1-AP messages. It can be seen that the S1-AP messages are created upon the SCTP layer and the IP layer.

There are some drawbacks of transmitting a backhaul message in a user plane connection. First, a backhaul control message is a control signal in essential, meaning that a backhaul control message should be treated as having higher priority. Nevertheless, a current relay station transmits a backhaul control message in the low-priority user plane connection, which may cause delay. Second, transmitting a backhaul control message in a user plane requires the creation of an IP layer, which waste radio resources in the wireless link.

If the wireless communication system 1 conforms to the IEEE 802.16m standard, there is no technology addressing on the issue of transmitting a backhaul control message. According to the aforementioned descriptions, a more efficient way to transmit a backhaul control message is needed in the wireless communication field.

SUMMARY

An objective of certain embodiments of the present invention is to provide a backhaul control communication method for use in a relay station. A wireless communication system comprises the relay station, a base station, and a core network. The relay station is wirelessly connected to the base station, while the base station is wiredly connected to the core network. The backhaul control communication method comprises the steps of (a) enabling the relay station to create a radio link having a control plane connection between the relay station and the base station, (b) enabling the relay station to create a backhaul link between the relay station and the base station by the control plane connection of the radio link and (c) enabling the relay station to transmit or receive a backhaul control message via the backhaul link.

Another objective of certain embodiments of the present invention is to provide a relay station for use in a wireless communication system. The wireless communication system comprises the relay station, a base station, and a core network. The relay station is wirelessly connected to the base station, while the base station is wiredly connected to the core network. The relay station comprises a processing unit and a transceiver. The processing unit is configured to create a radio link having a control plane connection between the relay station and the base station and create a backhaul link between the relay station and the base station by the control plane connection of the radio link. The transceiver is configured to transmit or receive a backhaul control message via the backhaul link.

Yet another objective of certain embodiments of the present invention is to provide a backhaul control communication method for use in a base station. A wireless communication system comprises a relay station, the base station, and a core network. The relay station is wirelessly connected to the base station, while the base station is connected to the core network by wires. The backhaul control communication method comprises the steps of (a) enabling the base station to create a radio link having a control plane connection between the relay station and the base station, (b) enabling the base station to create a backhaul link between the relay station and the base station by the control plane connection of the radio link, and (c) enabling the base station to receive/transmit a backhaul control message from/to the relay station.

A further objective of certain embodiments of the present invention is to provide a base station for use in a wireless communication system. The wireless communication system comprises a relay station, the base station, and a core network. The relay station is wirelessly connected to the base station, while the base station is wiredly connected to the core network, the base station comprises a processing unit and a transceiver. The processing unit is configured to create a radio link having a control plane connection between the relay station and the base station and create a backhaul link between the relay station and the base station by the control plane connection of the radio link. The transceiver is configured to receive/transmit a backhaul control message from/to the relay station.

The present invention creates a radio link having a control plane connection and then creates a backhaul link between the relay station and the base station by the control plane connection. By doing so, the present invention is able to transmit backhaul control messages via the backhaul link that is built on the control plane connection. Since all backhaul control messages are transmitted in the control plane connection, they are transmitted with less delay and higher security.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1A:
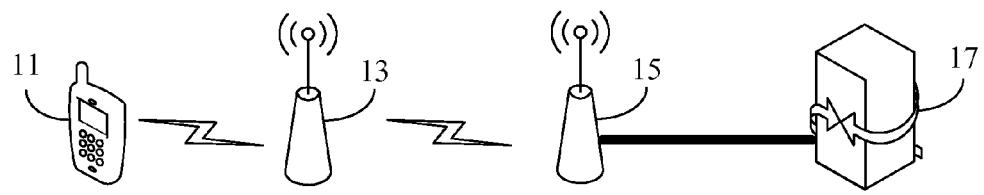
FIG. 1A illustrates a schematic view of a conventional wireless communication system.
Figure 1B:
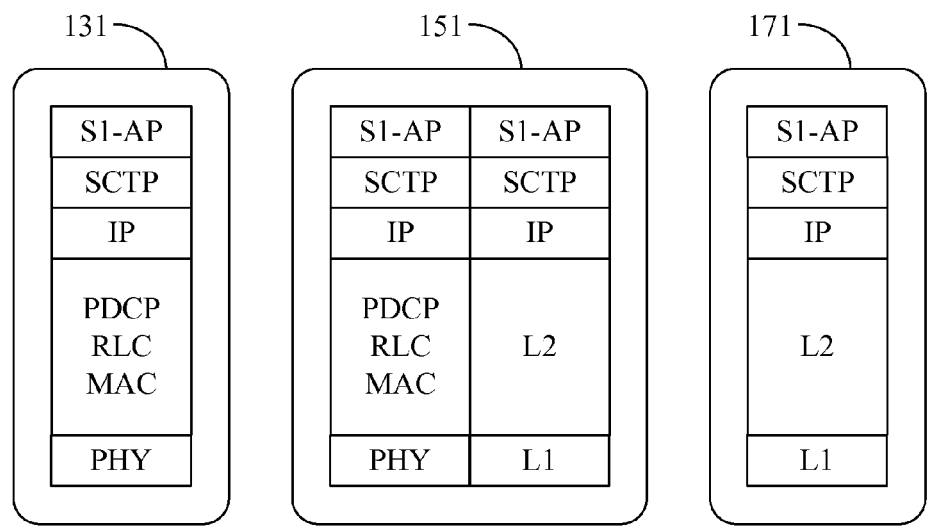
FIG. 1B illustrates the protocol stack of used by a wireless communication system conforming the LTE standard.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following descriptions, the present invention will be explained with reference to various example embodiments; nevertheless, these example embodiments are not intended to limit the present invention to any specific example, aspect, environment, applications, or particular implementations described in these example embodiments. Therefore, descriptions of these example embodiments are only provided for purpose of illustration but not to limit the present invention. It should be appreciated that elements unrelated directly to the present invention are omitted from the embodiments and the attached drawings.

Figure 2A:
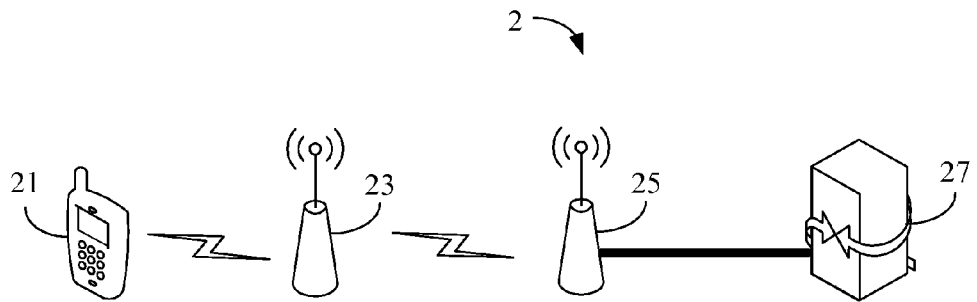
FIG. 2A illustrates a wireless communication system of a first example embodiment of the present invention.
Figure 2B:
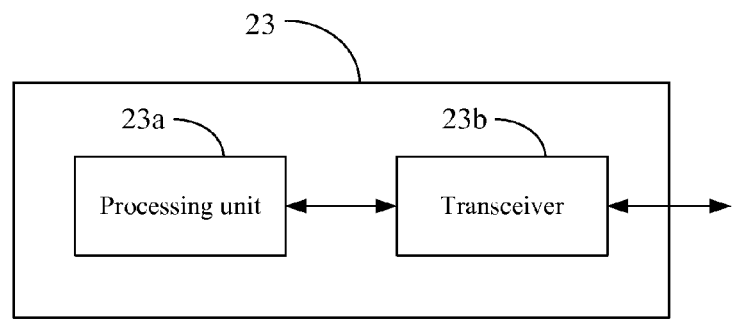
FIG. 2B illustrates a schematic view of the relay station of the present invention.
Figure 2C:
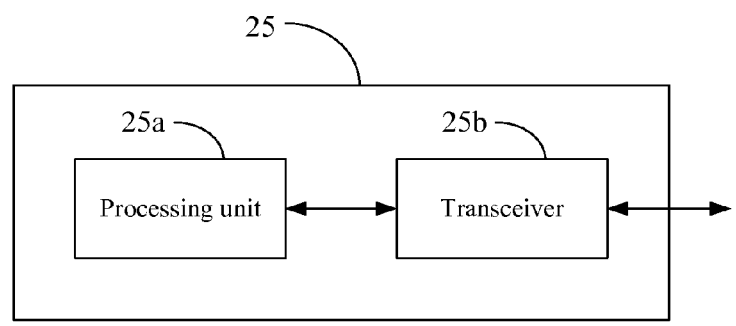
FIG. 2C illustrates a schematic view of the base station of the present invention.

FIG. 2A illustrates a first example embodiment of the present invention, which is a wireless communication system 2. The wireless communication system 2 comprises a user equipment 21, a relay station 23, a base station 25, and a core network 27. The relay station 23 is wirelessly connected to the base station 25, while the base station 25 is wiredly connected to the core network 27. The relay station 23 comprises a processing unit 23a and a transceiver 23b as drawn in FIG. 2B, while the base station 25 comprises a processing unit 25a and a transceiver 25b as drawn in FIG. 2C. Each of the processing units 23a, 25a may be any of various processors, central processing units (CPUs), microprocessors, or other computing devices known to people skilled in the art. In addition, each of the transceivers 23b, 25b may be any of various transceivers that known to people skilled in the art.

Figure 2D:
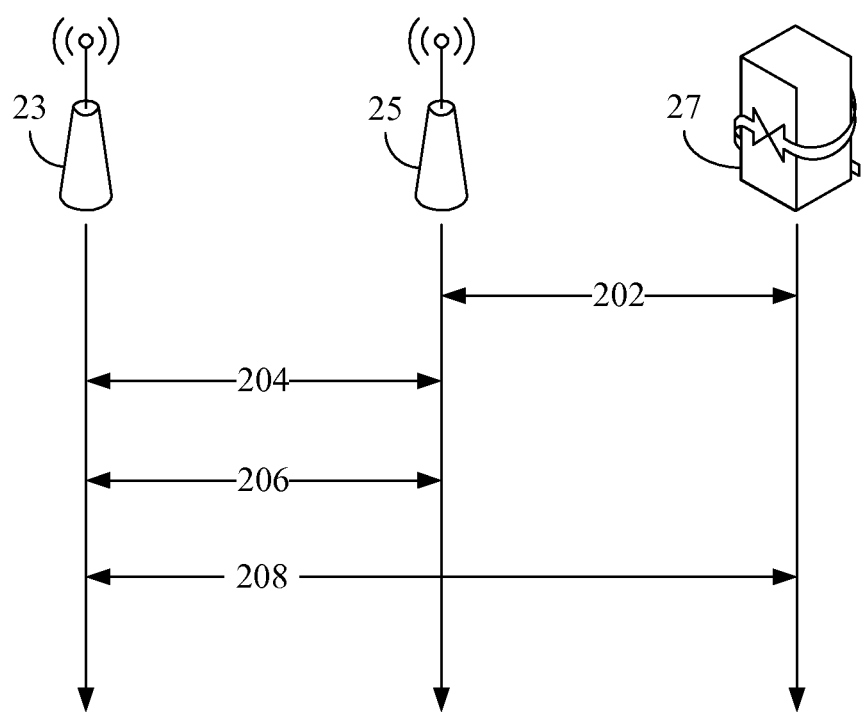
FIG. 2D illustrates the signal flows of the creation of the backhaul link between the relay station and the base station and the transmission of backhaul control messages.

In order to serve the user equipment 21 like a base station (such as the base station 25) does, the relay station 23 has to create a backhaul link between the relay station 23 and the base station 25. The following descriptions will focus on the creation of the backhaul link between the relay station 23 and the base station 25 and the transmission of backhaul control messages, whose signal flows are illustrated in FIG. 2D.

First, the processing unit 25a of the base station 25 performs a backhaul link creation process 202 to build a backhaul link between the base station 25 and the core network 27, which is well-known to people skilled in the art. Afterwards, both the processing unit 23a of the relay station 23 and the processing unit 25a of the base station 25 perform a radio connection procedure 204 to create a radio link 204 between the relay station 23 and the base station 25, wherein the radio link 204 has a control plane connection. It is noted that relay station 23 and the base station 25 can perform the radio connection procedure 204 during an attach procedure, a connection establishment procedure, etc. The processing units 23a, 25a then performs a backhaul link creation procedure 206 to create a backhaul link between the relay station 23 and the base station 25 by the control plane connection of the radio link. Thereafter, the transceiver 23b of the relay station 23 is able to transmit a further backhaul control message 208 to the core network 27 via the backhaul link between the relay station 23 and the base station 25 together with the backhaul link between the base station 25 and the core network 27. The transceiver 25b of the base station 25 will receives the backhaul control message 208 from the relay station 23.

In the first example embodiment, the relay station 23 transmits all backhaul control messages to the core network 27 by the control plane connection instead of a user plane connection. Transmitting backhaul control messages by the control plane connection means that the extra overheads in processing signals in the user plane connection are eliminated. In addition, the security mechanism provided in the control plane connection is more robust than that provided by the user plane connection, so the relay station 23 transmits backhaul control messages in a safer environment.

A second example embodiment of the present invention is also the wireless communication system 2. Particularly, the wireless communication system 2 conforms to the long term evolution (LTE) standard. In this example embodiment, the relay station 23 may be named as a relay node (RN) or a Relay E-UTRAN NodeB (Relay eNB or ReNB), the base station 25 may be named as a Doner E-UTRAN NodeB (DeNB), the core network 27 is an Evolved Packet Core (EPC), which may be a Mobility Management Entity (MME), a PDN Gateway (P-GW), a Serving Gateway (S-GW). It is noted that different organizations and/or companies name the relay station, base station, and core network of the LTE standard in different ways, so the above specific names of the relay station 23, base station 25, and core network 25 are not used to limit the scope of the present invention. Since the wireless communication system 2 is specialized for the LTE standard, the aforementioned radio connection procedure 204 and the backhaul link creation procedure 206 are specialized for the LTE standard as well.

During the aforementioned radio connection procedure 204, the processing units 23a, 25a cooperate with each other to create the radio link by creating a downlink path and an uplink path between the relay station 23 and the base station 25. For example, the uplink path may be a ULInformationTransfer message of the LTE standard, and the downlink path may be a DLInformationTransfer message of the LTE standard.

During the aforementioned backhaul link creation procedure 206, the processing units 23a, 25a cooperate with each other to create the backhaul link between the relay station 23 and the base station 25 by creating an S1 interface of the LTE standard therebetween. Conventionally, an S1 interface is an interface between a base station (such as an eNB) and a core network (e.g. an EPC), so the relay station 23 can act like as a base station after building the S1 interface. The application layer signaling protocol of S1 interface is referred to as S1-AP (S1 Application Protocol). To achieve the creation of the S1 interface, the processing units 23a, 25a have to revise some configurations of the LTE standard first. Specifically, the processing units 23a, 25a adds a parameter in the dedicatedInformationType of the LTE standard, which is related to a container for dedicated information of S1-AP message and is used to transfer relay system specific S1 layer information between the network and the relay station. It means that both the ULInformationTransfer Configuration and the DLInformationTransfer Configuration are revised by adding a field for the S1 interface. For example, if the field for the container for dedicated information of S1-AP message is named as dedicatedInfoS1AP, then dedicatedInfoS1AP and its relevant Information Element (IE) (e.g. DedicatedInfoS1AP) are both added to the ULInformationTransfer Configuration and the DLInformationTransfer Configuration as shown in Table 1 and Table 2. Besides, the information element of the container for dedicated information of S1-AP message (e.g. DedicatedInfoS1AP) is revised as shown in Table 3.

TABLE 1

| ULInformationTransfer-rxIEs ::- | SEQUENCE { |
| --- | --- |
| dedicatedInformationType | CHOICE { |
| dedicatedInfoNAS | DedicatedInfoNAS |
| dedicatedInfoCDMA2000-1XRTT | DedicatedInfoCDMA2000, |
| dedicatedInfoCDMA2000-HRPO | DedicatedInfoCDMA2000 |
| dedicatedInfoS1AP | DedicatedInfoS1AP, |
| } | |
| nonCriticalExtension | SEQUENCE{ } OPTIONAL |

TABLE 2

| DLInformationTransfer-rxIEs ::- | SEQUENCE { |
| --- | --- |
| dedicatedInformationType | CHOICE { |
| dedicatedInfoNAS | DedicatedInfoNAS |
| dedicatedInfoCDMA2000-1XRTT | DedicatedInfoCDMA2000, |
| dedicatedInfoCDMA2000-HRPO | DedicatedInfoCDMA2000 |
| dedicatedInfoS1AP | DedicatedInfoS1AP, |
| } | |
| nonCriticalExtension | SEQUENCE{ } OPTIONAL |

TABLE 3

--ASN1START
DedicatedInfoS1AP::=OCTET STRING;
--ASN1STOP

After the processing units 23a, 25a have revised some configurations of the LTE standard, the processing units 23a, 25a utilize these configurations to carry the S1 interface. The details are elaborated below. The creation of the S1 interface starts from the relay station 23. The processing unit 23a of the relay station 23 generates an S1 setup request message, generates a first S1-AP message carrying the S1 setup request message by the container for dedicated information of S1-AP message, and generates an uplink message carrying the first S1-AP message by the ULInformationTransfer message. The transceiver 23b then transmits the uplink message to the base station 25.

The transceiver 25b of the base station 25 receives the uplink message. Then, the processing unit 25a of the base station 25 extracts the first S1-AP message from the uplink message by removing the ULInformationTransfer message, and then extracts the S1 setup request message from the first S1-AP message by removing the container for dedicated information of S1-AP message. After the base station 25 derives the S1 setup request message, the processing unit 25a of the base station 25 may generate an S1 setup response message directly. Alternatively, the base station 25 may wait a response from the core network 27 and then generate an S1 setup response message. The processing unit 25a also adds a parameter of a container for dedicated information of S1-AP message in a dedicatedInformationType of the LTE standard. Thereafter, the processing unit 25a of the base station 25 generates a second S1-AP message carrying the S1 setup response message by the dedicatedInfoS1AP interface, and then generates a downlink message carrying the second S1-AP message by the DLInformationTransfer message. Then, the transceiver 25b of the base station 25 transmits the downlink message to the relay station 23.

The transceiver 23b of the relay station 23 receives the downlink message from the base station 25. The processing unit 23a extracts the second S1-AP message from the downlink message by removing the DLInformationTransfer message, and then extracts the S1 setup response message from the second S1-AP message by removing the container for dedicated information of S1-AP message. By the generation, process and transmission of the above S1 setup request message and S1 setup response message, the backhaul link between the relay station 23 and the base station 25 has been established on the control plane connection.

Figure 2E:
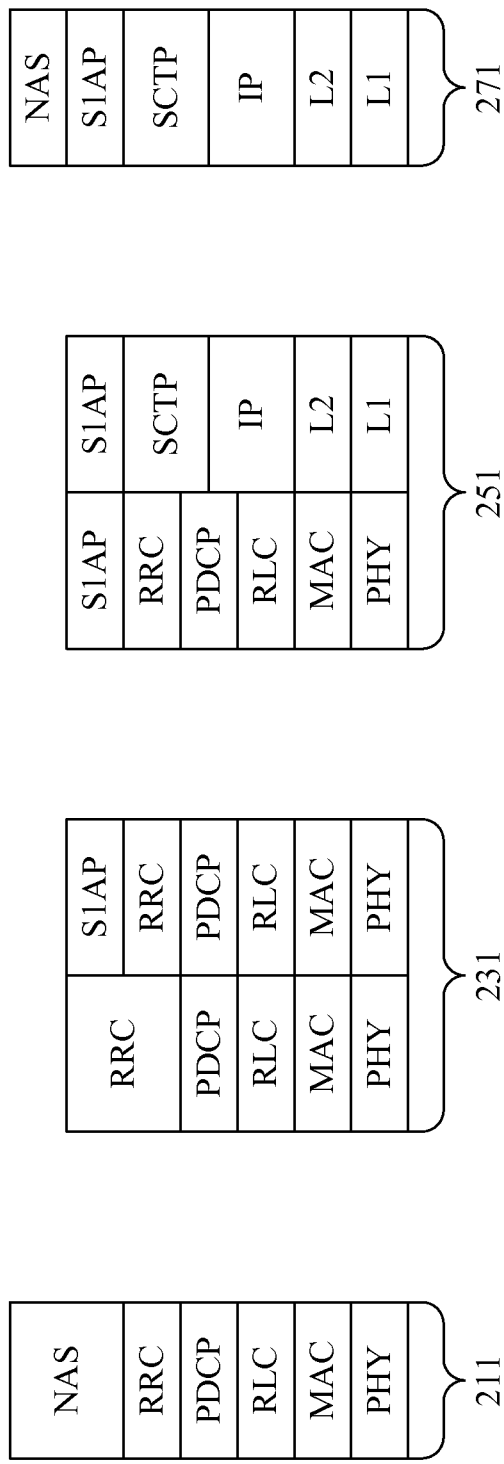
FIG. 2E illustrates the protocol stacks of the second example embodiment.

FIG. 2E illustrates the protocol stacks of the second example embodiment. The protocol stacks 211, 231, 251, and 271 respectively correspond to the user equipment 21, the relay station 23, the base station 25, and the core network 27. The relay station 23 and the base station 25 communicate with the core network 27 via the S1-AP messages. It can be seen that the S1-AP messages are created upon the Radio Resource Control (RRC) layer and Packet Data Convergence Protocol (PDCP) layer instead of the SCTP layer and the IP layer.

After the creation of the backhaul link over the control plane connection, the relay station 23 can transmit all backhaul control messages to the core network 27 through the base station 25 via the backhaul link built on the control plane connection. There are several occasions that the relay station 25 has to transmit a backhaul control message to the core network 27 through the base station 25. Some examples of the occasions are given here. One example of the occasions is when the relay station 25 receives an RRC signal directing to the core network 27 from the user equipment 21. Another example of the occasions is when the relay station 25 receives an S1 message that has to respond to the base station 25. Yet another example of the occasions is when the relay station 25 actively transmits a backhaul control message. A further example of the occasions is when the relay station 25 has to relay an S1 message from a sub-ordinate relay station in a multi-hop scenario.

An example that the user equipment 21 transmits a radio resource control (RRC) signal to the relay station 23 is given here. The transceiver 23b of the relay station 23 receives the RRC signal from the user equipment 21, and the processing unit 23a then generates a backhaul control message related to the RRC signal. Following that, the processing unit 23a adds the parameter of the container for dedicated information of S1-AP message in the dedicatedInformationType of the LTE standard. Then, the processing unit 23a generates the backhaul control message, generates an uplink S1-AP control message carrying the backhaul control message by the container for dedicated information of S1-AP message, and generates an uplink control message carrying the uplink S1-AP control message by the ULInformationTransfer message. The transceiver 23b of the relay station 23 then transmits the uplink control message to the base station 25.

Afterwards, the transceiver 25b of the base station 25 receives the uplink control message. Then, the processing unit 25a of the base station 25 extracts the uplink S1-AP control message from the uplink control message by removing the ULInformationTransfer message. The processing unit 25a of the base station 25 further extracts the backhaul control message from the uplink S1-AP control message by removing the container for dedicated information of S1-AP message. Depending on the content of the backhaul control message, the base station may respond by itself or transmits a message corresponding to the backhaul control message to the core network 27.

Likewise, the base station may generate a backhaul control message or transmits a message corresponding to the backhaul control message from the core network 27. The processing unit 25a of the base station 25 adds the parameter of the container for dedicated information of S1-AP message in the dedicatedInformationType of the LTE standard. Then, the processing unit 25a generates a backhaul control message or the transceiver 25b receives a backhaul control message from the core network 27. Then, the processing unit 25a of the base station 25 generates a downlink S1-AP control message carrying the backhaul control message by the container for dedicated information of S1-AP message and then generates a downlink control message carrying the downlink S1-AP control message by the DLInformationTransfer message. The transceiver 25b then transmits the downlink control message to the relay station 23.

Afterwards, the transceiver 23b of the relay station 23 receives the downlink control message from the base station 25. Next, the processing unit 23a extracts the downlink S1-AP control message from the downlink control message by removing the DLInformationTransfer message, and then extracts a backhaul control response message from the downlink S1-AP control message by removing the container for dedicated information of S1-AP message.

According to the above descriptions, all backhaul control messages are transmitted in the control plane connection between the relay station 23 and the base station 25. If there is another relay station (not shown) in the wireless communication system 2 and the relay station 23 is the super-ordinate relay station, then the relay station 23 is able to play the role of a base station. It means that the relay station 23 is able to perform all the aforementioned operations performed by the base station 25. Comparing to conventional technologies, backhaul control messages are transmitted with less delay and in a safer fashion.

A third example embodiment of the present invention is also the wireless communication system 2 conforming to the LTE standard. Similarly, the relay station 23 may be a relay node, a Relay eNB, or a ReNB, the base station 25 may be a DeNB, the core network 27 may be an MME, a P-GW, or an S-GW. The difference between the third example embodiment and the second example embodiment is that the third example embodiment creates an X2 interface of the LTE standard instead of an S1 interface of the LTE standard.

During the aforementioned radio connection procedure 204, the processing units 23a, 25a cooperate with each other to create the radio link by creating a downlink path and an uplink path between the relay station 23 and the base station 25. For example, the uplink path may be a ULInformationTransfer message of the LTE standard, and the downlink path may be a DLInformationTransfer message of the LTE standard.

During the aforementioned backhaul link creation procedure 206, the processing units 23a, 25a cooperate with each other to create the backhaul link between the relay station 23 and the base station 25 by creating an X2 interface of the LTE standard therebetween. Conventionally, an X2 interface is an interface between a base station (such as an eNB) and another base station, so the relay station 23 can act like as a base station after building the X2 interface. The application layer signaling protocol of X2 interface is referred to as X2-AP (X2 Application Protocol). To achieve the creation of the X2 interface, the processing units 23a, 25a have to revise some configurations of the LTE standard first. Specifically, the processing units 23a, 25a add a parameter in a dedicatedInformationType of the LTE standard. The parameter is related to a container for dedicated information of X2-AP message and is used to transfer relay system specific X2 layer information between the network and the relay station. It means that both the ULInformationTransfer Configuration and the DLInformationTransfer Configuration are revised by adding the container for dedicated information of X2-AP message. For example, if the field of the container for dedicated information of X2-AP message is named as dedicatedInfoX2AP, then dedicatedInfoX2AP and its relevant IE (e.g. DedicatedInfoX2AP) are both added to the ULInformationTransfer Configuration and the DLInformationTransfer Configuration as shown in Table 4 and Table 5. Besides, the information element of the container for dedicated information of X2-AP message (e.g. DedicatedInfoX2AP) is revised as shown in Table 6.

TABLE 4

| ULInformationTransfer-rxIEs ::- | SEQUENCE { |
|---|---|
|   dedicatedInformationType | CHOICE { |
|     dedicatedInfoNAS | DedicatedInfoNAS |
|     dedicatedInfoCDMA2000-1XRTT | DedicatedInfoCDMA2000, |
|     dedicatedInfoCDMA2000-HRPO | DedicatedInfoCDMA2000 |
|     dedicatedInfoX2AP | DedicatedInfoX2AP, |
| } | |
|   nonCriticalExtension | SEQUENCE{ } OPTIONAL |

TABLE 5

| DLInformationTransfer-rxIEs ::- | SEQUENCE { |
|---|---|
|   dedicatedInformationType | CHOICE { |
|     dedicatedInfoNAS | DedicatedInfoNAS |
|     dedicatedInfoCDMA2000-1XRTT | DedicatedInfoCDMA2000, |

TABLE 5-continued

| dedicatedInfoCDMA2000-HRPO | DedicatedInfoCDMA2000 |
| dedicatedInfoX2AP | DedicatedInfoX2AP, |
| } | |
| nonCriticalExtension | SEQUENCE{ } OPTIONAL |

TABLE 6

--ASN1START
DedicatedInfoX2AP::=OCTET STRING;
--ASN1STOP

After the processing units 23a, 25a have revised some configurations of the LTE standard, the processing units 23a, 25a utilize these configurations to create the X2 interface. The details are elaborated below. The creation of the X2 interface starts from the relay station 23. The processing unit 23a of the relay station 23 generates an X2 setup request message, generates a first X2-AP message carrying the X2 setup request message by the container for dedicated information of X2-AP message, and generates an uplink message carrying the first X2-AP message by the ULInformationTransfer message. In other words, the ULInformationTransfer message and the container for dedicated information of X2-AP message form a container of the X2 setup request message. The transceiver 23b then transmits the uplink message to the base station 25.

The transceiver 25b of the base station 25 receives the uplink message. Then, the processing unit 25a of the base station 25 extracts the first X2-AP message from the uplink message by removing the ULInformationTransfer message, and then extracts the X2 setup request message from the first X2-AP message by removing the container for dedicated information of X2-AP message. After the base station 25 derives the X2 setup request message, the processing unit 25a of the base station 25 may generate an X2 setup response message directly. Alternatively, the base station 25 may wait a response from the core network 27 and then generate an X2 setup response message. The processing unit 25a also adds a parameter of a container for dedicated information of X2-AP message in a dedicatedInformationType of the LTE standard. Thereafter, the processing unit 25a of the base station 25 generates a second X2-AP message carrying the X2 setup response message by the container for dedicated information of X2-AP message, and then generates a downlink message carrying the second X2-AP message by the DLInformationTransfer message. Then, the transceiver 25b of the base station 25 transmits the downlink message to the relay station 23.

The transceiver 23b of the relay station 23 receives the downlink message from the base station 25. The processing unit 23a extracts the second X2-AP message from the downlink message by removing the DLInformationTransfer message, and then extracts the X2 setup response message from the second X2-AP message by removing the container for dedicated information of X2-AP message. By the generation, process and transmission of the above X2 setup request message and X2 setup response message, the backhaul link between the relay station 23 and the base station 25 has been established on the control plane connection.

Figure 2F:
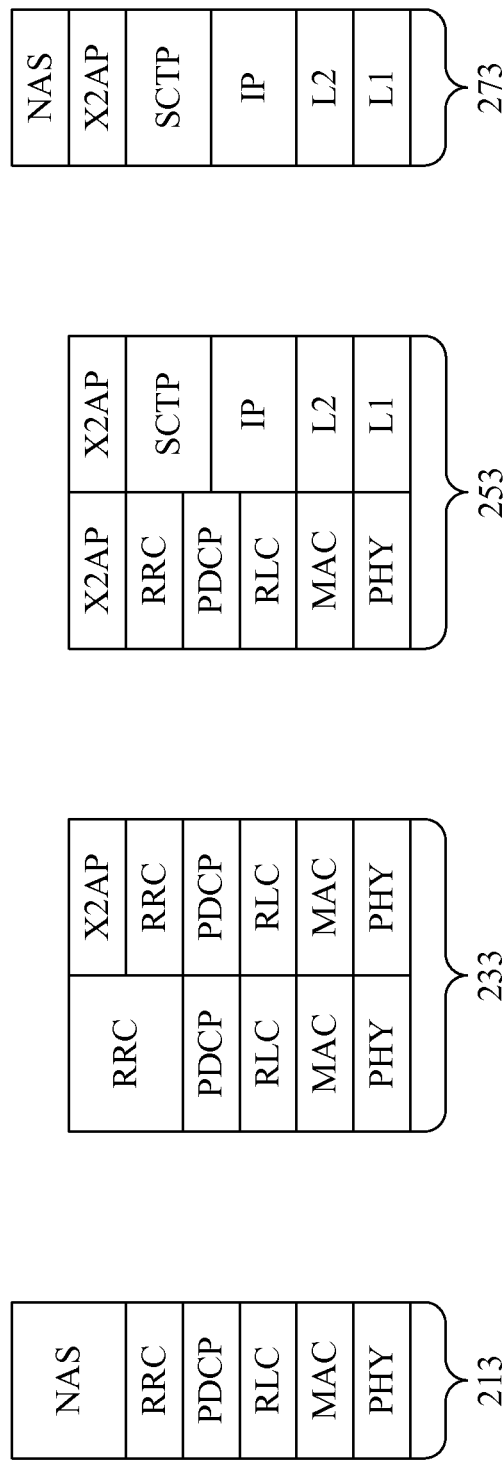
FIG. 2F illustrates the protocol stacks of the third example embodiment.

FIG. 2F illustrates the protocol stacks of the third example embodiment. The protocol stacks 213, 233, 253, and 273 respectively correspond to the user equipment 21, the relay station 23, the base station 25, and other base station(s). The relay station 23 and the base station 25 communicate with the each other or other base stations via the X2-AP messages. It can be seen that the X2-AP messages are created upon the RRC layer and PDCP layer instead of the SCTP layer and the IP layer.

After the creation of the backhaul link over the control plane connection, the relay station 23 can transmit all backhaul control messages to the base station or other base stations through the base station 25 via the backhaul link built on the control plane connection. There are several occasions that the relay station 25 has to transmit a backhaul control message through the base station 25. Some examples of the occasions are given here. One example of the occasions is when the relay station 25 receives an RRC signal from the user equipment 21. Another example of the occasions is when the relay station 25 receives an X2 message that has to respond to from the base station 25. Yet another example of the occasions is when the relay station 25 actively transmits a backhaul control message. A further example of the occasions is when the relay station 25 has to relay an X2 message from a subordinate relay station in a multi-hop scenario.

An example that the user equipment 21 transmits an RRC signal to the relay station 23 is given here. The transceiver 23b of the relay station 23 receives the RRC signal from the user equipment 21, and the processing unit 23a then generates a backhaul control message related to the RRC signal. Following that, the processing unit 23a adds the parameter of the container for dedicated information of X2-AP message in the dedicatedInformationType of the LTE standard. Then, the processing unit 23a generates the backhaul control message, generates an uplink X2-AP control message carrying the backhaul control message by the container for dedicated information of X2-AP message, and generates an uplink control message carrying the uplink X2-AP control message by the ULInformationTransfer message. The transceiver 23b of the relay station 23 then transmits the uplink control message to the base station 25.

Afterwards, the transceiver 25b of the base station 25 receives the uplink control message. Then, the processing unit 25a of the base station 25 extracts the uplink X2-AP control message from the uplink control message by removing the ULInformationTransfer message after receiving the uplink control message. The processing unit 25a of base station 25 further extracts the backhaul control message from the uplink X2-AP control message by removing the container for dedicated information of X2-AP message. Depending on the content of the backhaul control message, the base station may respond by itself or transmits a message corresponding to the backhaul control message to the base station.

Likewise, the base station may generate a backhaul control message or transmits a message corresponding to the backhaul control message from other base station(s). The processing unit 25a of the base station 25 adds the parameter of the container for dedicated information of X2-AP message in the dedicatedInformationType of the LTE standard. Then, the processing unit 25a generates a backhaul control message or receives a backhaul control message from the other base station(s). Then, the processing unit 25a of the base station 25 generates a downlink X2-AP control message carrying the backhaul response message by the container for dedicated information of X2-AP message and then generates a downlink control message carrying the downlink X2-AP control message by the DLInformationTransfer message. The transceiver 25b of the base station 25 then transmits the downlink control message to the relay station 23.

Afterwards, the transceiver 23b of the relay station 23 receives the downlink control message from the base station 25. Next, the processing unit 23a extracts the downlink X2-AP control message from the downlink control message by removing the DLInformationTransfer message, and then extracts a backhaul control response message from the downlink X2-AP control message by removing the container for dedicated information of X2-AP message.

According to the above descriptions, all backhaul control messages are transmitted in the control plane connection between the relay station 23 and the base station 25. If there is another relay station (not shown) in the wireless communication system 2 and the relay station 23 is the super-ordinate relay station, then the relay station 23 is able to play the role of a base station. It means that the relay station 23 is able to perform all the aforementioned operations performed by the base station 25. Comparing to conventional technologies, backhaul control messages are transmitted with less delay and in a safer fashion.

A fourth example embodiment of the present invention is also the wireless communication system 2 conforming to the LTE standard. Similarly, the relay station 23 may be a relay node, a Relay eNB, or a ReNB, the base station 25 may be a DeNB, the core network 27 may be an MME, a P-GW, a S-GW. The difference between the fourth example embodiment and the second and third example embodiments is that the fourth example embodiment creates both an S1 interface and an X2 interface of the LTE standard. The processes to create the S1 interface and the X2 interface are the same as the processes described in the second and third example embodiments, so the details are not repeated here.

Likewise, after the creation of the backhaul link (comprising both the S1 interface and the X2 interface) over the control plane connection, the relay station 23 can transmit all backhaul control messages to the core network 27 or other base station(s) through the base station 25 via the backhaul link (comprising both the S1 interface and the X2 interface) built on the control plane connection. The processes of transmitting backhaul control messages by the S1 interface and the X2 interface of the backhaul link are the same as the processes described in the second and third example embodiments, so the details are not repeated here as well.

It is noted in other example embodiments, the downlink path created comprised in the radio link may be an RRCConnectionReconfiguration instead of the DLInformationTransfer. In those example embodiments, the RRCConnectionReconfiguration is revised by adding the container for dedicated information of S1-AP message. For example, if the container for dedicated information of S1-AP message is named as dedicatedInfoS1AP interface, then dedicatedInfoS1AP and DedicatedInfoS1AP are both added to the RRCConnectionReconfiguration as shown in Table 7. The "Un" written in Table 7 means that the field is mandatory present in the Un interface; otherwise, the field is optionally present and is needed to be set as ON. It is noted that the container for dedicated information of S1-AP message is added to the information element of the r8 version of the LTE standard here; however, the container for dedicated information of S1-AP message may be added to the information element of other versions of the LTE standard. People skilled in the art can understand how to replace DLInformationTransfer by the RRCConnectionReconfiguration in other example embodiments according to the explanations of the above example embodiments. Thus, the details are not repeated here.

TABLE 7

```
--ASN1START
RRCConnectionReconfiguration ::= SEQUENCE {
    rrc-TransactionIdentifier          RRC-TransactionIdentifier;,
    criticalExtensions                 CHOICE {
        c1                             CHOICE {
            rrcConnectionReconfiguration-r8  RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture       SEQUENCE { }
    }
}
RRCConnectionReconfiguration-r8-IEs ::= SEQUENCE {
    measConfig            MeasConfig            OPTIONAL,      -- Need ON
    mobilityControlInfo   MobilityControlInfo   OPTIONAL,      -- Cond Ho
    dedicatedInfoNASList  SEQUENCE (SIZE(1..maxDRB) OF
                              DedicatedInfoNAS  OPTIONAL,      -- Cond nonHO
    dedicatedInfoS1AP     DedicatedInfoS1AP     OPTIONAL,      -- Cond Un
    radioResourceConfigDedicated RadioResourceConfigDedicated OPTIONAL, -- Cond Ho-toEUTRA
    securityConfigDedicated   RadioResourceConfigDedicated   OPTIONAL, -- Cond HO
    nonCriticalExtension      SEQUENCE{ }       OPTIONAL       -- Need OP
}
SecurityConfigHO ::=   SEQUENCE{
    handoverType                 CHOICE {
        intraLTE                 SEQUENCE {
            securityAlogrithmConfig    SecurityAlgorithmConfig    OPTIONAL,
--Need OP
            keyChangeIndicator         BOOLEAN,
            nextHopChainingCount       NextHopChainCount
        },
        interRAT                 SEQUENCE{
            securityAlgorithmConfig    SecurityAlgorithmConfig,
            nas-SecurityParamToEUTRA   OCTET STRING (SIZE(6))
        }
    },
    ...
}
--ASN1STOP
```

Similarly, if there is another relay station (not shown) in the wireless communication system 2 and the relay station 23 is the super-ordinate relay station, then the relay station 23 is able to play the role of a base station. It means that the relay station 23 is able to perform all the aforementioned operations performed by the base station 25.

A fifth example embodiment of the present invention is also the wireless communication system 2. Particularly, the wireless communication system 2 conforms to the IEEE 802.16m standard. In this example embodiment, the user equipment 21 may be an advanced mobile station (AMS), the relay station 23 may be an advanced relay station (ARS), the base station 25 may be an advanced base station (ABS), and the core network 27 may be an Access Service Network (ASN) gateway. Since the wireless communication system 2 is specialized for the IEEE 802.16m standard, the aforementioned radio connection procedure 204 and the backhaul link creation procedure 206 are specialized for the IEEE 802.16m standard as well.

During the aforementioned radio connection procedure 204, the processing unit 23a creates the radio link having a control plane connection. Thereafter, the transceivers 23b, 25b transmit and receive all backhaul control messages within a container to the core network 27 via the backhaul link. Particularly, the container is the AAI_L2-XFER interface of the IEEE 802.16m standard.

Figure 3:
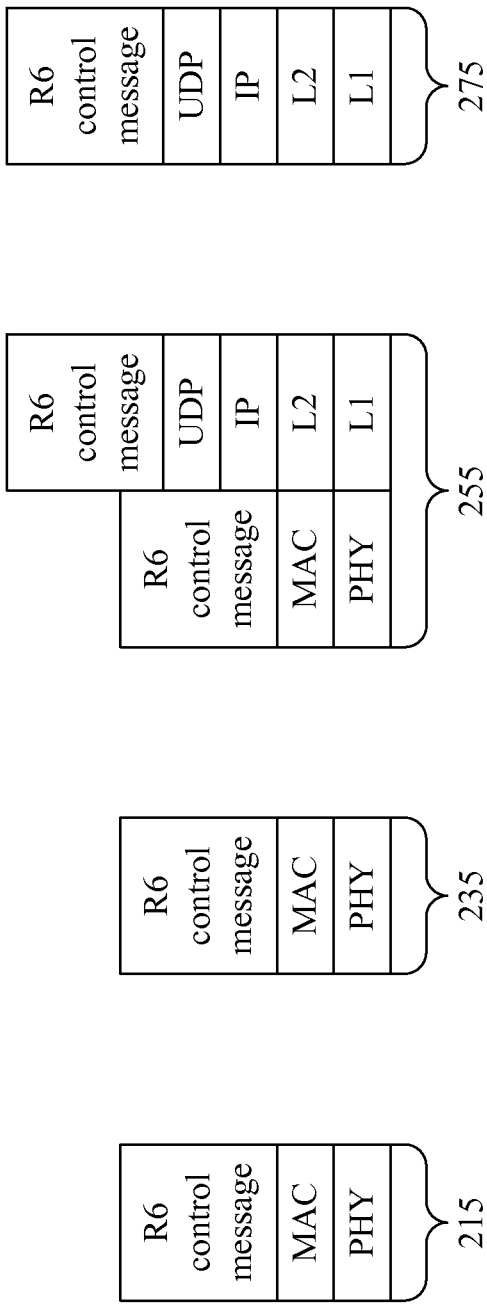
FIG. 3 illustrates the protocol stacks of the fifth example embodiment.

FIG. 3 illustrates the protocol stacks of the fifth example embodiment. The protocol stacks 215, 235, 255, and 275 respectively correspond to the user equipment 21, the relay station 23, the base station 25, and the core network 27. The backhaul control messages (i.e. the R6 control message) are transmitted in the control plane connection (i.e. above the MAC layer) between the relay station 23 and the base station 25.

Like the aforementioned example embodiments, if there is another relay station (not shown) in the wireless communication system 2 and the relay station 23 is the super-ordinate relay station, then the relay station 23 is able to play the role of a base station. It means that the relay station 23 is able to perform all the aforementioned operations performed by the base station 25.

A sixth example embodiment of the present invention is a backhaul control communication method, which is adapted for a relay station. A wireless communication system comprises a user equipment, the relay station, a base station, and a core network. The relay station is wirelessly connected to the base station, while the base station is wiredly connected to the core network. Like the relay stations in the above example embodiments, the relay station in the sixth example embodiment has to build a backhaul link between the relay station and the base station in order to serve the user equipment like a base station does, which is the goal of the backhaul control communication method of the sixth example embodiment.

Figure 4A:
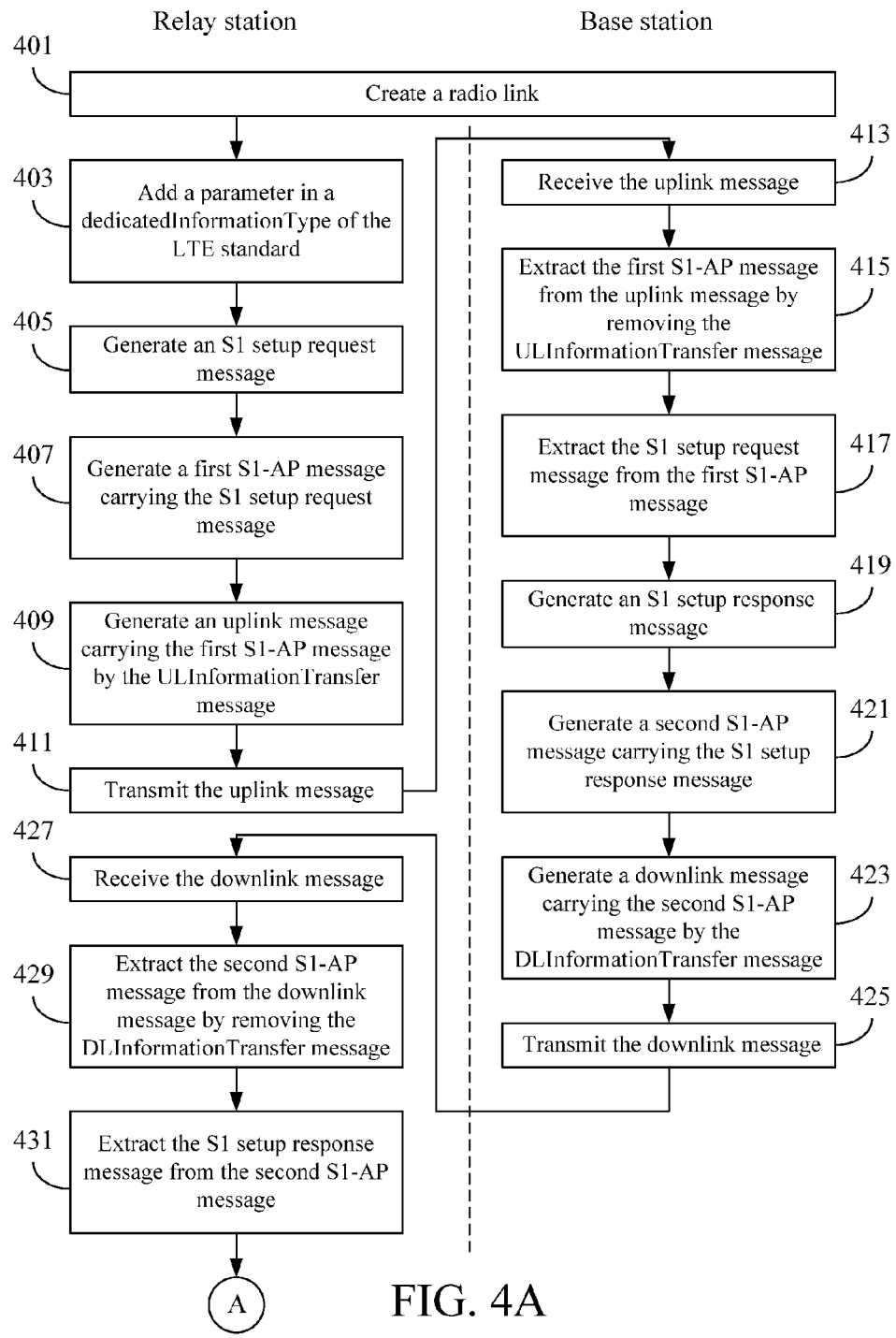
FIG. 4A, FIG. 4B, and FIG. 4C illustrate the flowchart of the backhaul control communication method of the sixth example embodiment.
Figure 4B:
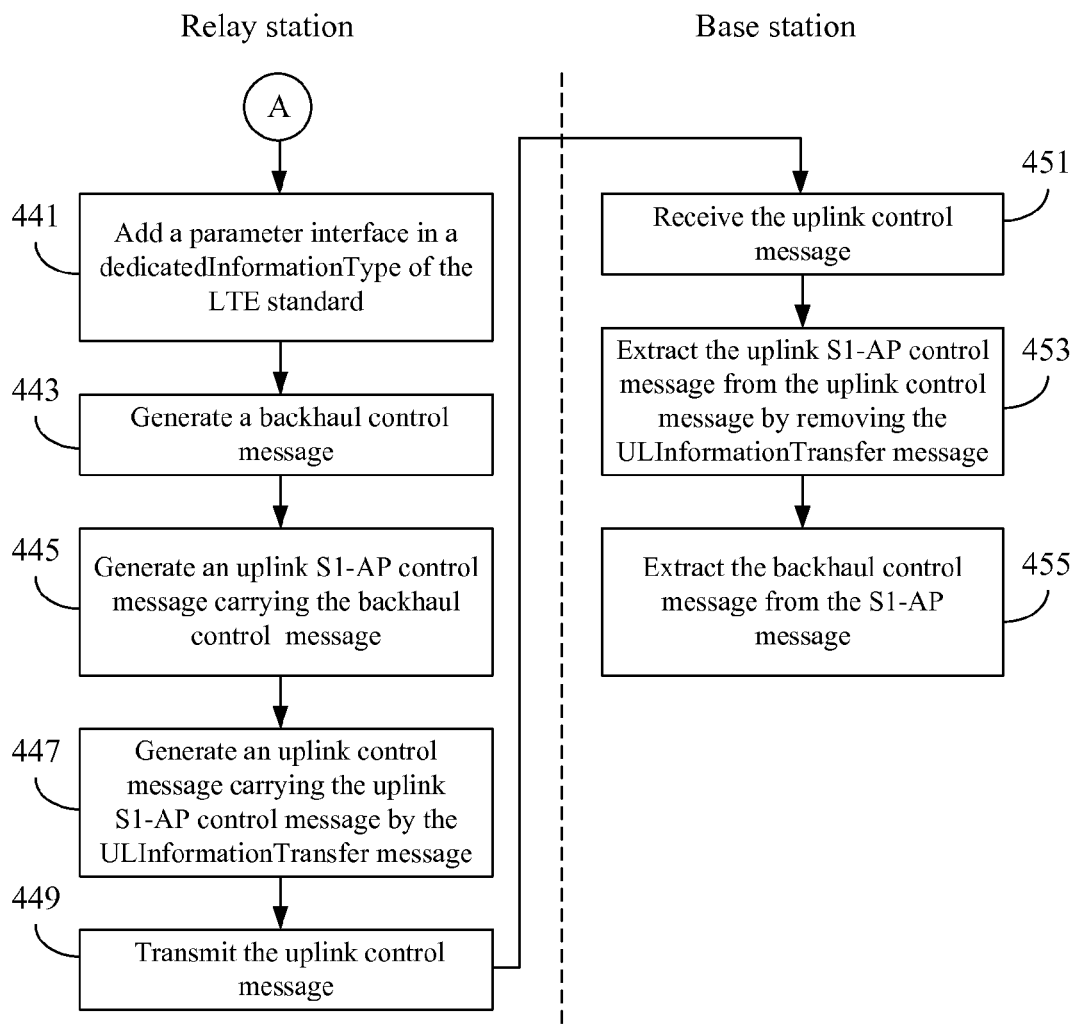
Figure 4C:
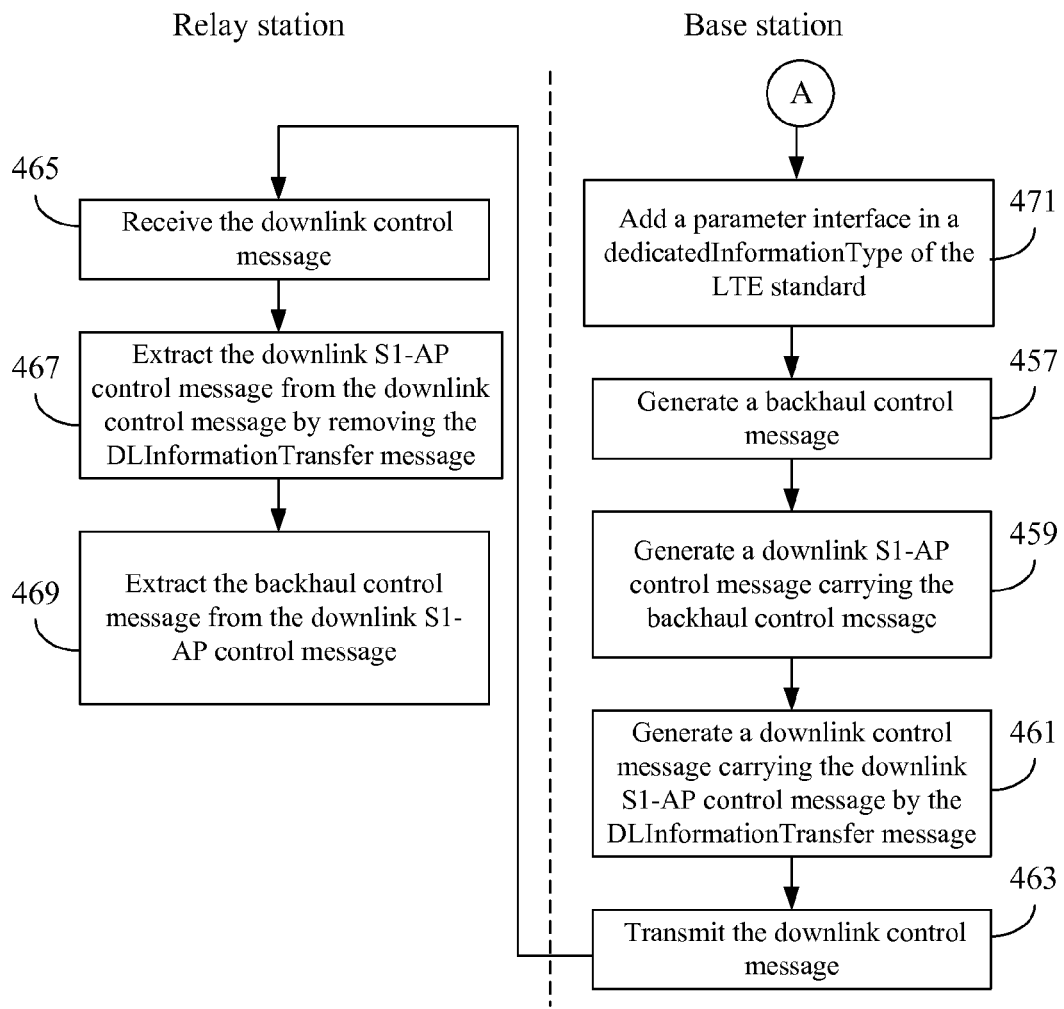

The flowchart of the backhaul control communication method is illustrated in FIG. 4A, FIG. 4B, and FIG. 4C. First, the backhaul control communication method executes step 401 to enable the relay station and the base station to create a radio link having a control plane connection between the relay station and the base station. It is assume that the wireless communication system conforms to the LTE standard in this example embodiment, so the relay station creates the radio link by creating a downlink path and an uplink path. To be more specific, the uplink path is a ULInformationTransfer message of the LTE standard, and the downlink path is a DLInformationTransfer message.

Next, the backhaul control communication enables the relay station to cooperate with the base station to create a backhaul link between the relay station and the base station. Since the wireless communication system conforms to the LTE standard, the backhaul control communication method creates the backhaul link by creating an S1 interface of the LTE standard between the relay station and the base station. Particularly, the creation of the backhaul link may be achieved by the steps 403-431.

In step 403, the relay station adds a parameter of a container for dedicated information of S1-AP message in a dedicated-InformationType of the LTE standard. Next, steps 405, 407, and 409 are executed to respectively enable the relay station to generate an S1 setup request message, generate a first S1-AP message carrying the S1 setup request message by the container for dedicated information of S1-AP message, and generate an uplink message carrying the first S1-AP message by the ULInformationTransfer message. Following that, the backhaul control communication method executes step 411 to transmit the uplink message.

Afterwards, the backhaul control communication method enables the base station to executes step 413 to receive the uplink message. Next, the base station executes step 415 and 417 to respectively extract the first S1-AP message from the uplink message by removing the ULInformationTransfer message and extract the S1 setup request message from the first S1-AP message by removing the container for dedicated information of S1-AP message. Then, the base station executes steps 419, 421, and 423 respectively to generate an S1 setup response message, generate a second S1-AP message carrying the S1 setup response message by the container for dedicated information of S1-AP message, and generate a downlink message carrying the second S1-AP message by the DLInformationTransfer message. Next, the base station executes step 425 to transmit the downlink message.

Following that, the backhaul control message executes step 427 to enable the relay station to receive the downlink message. Then, the relay station executes step 429 and 431 to respectively extract the second S1-AP message from the downlink message by removing the DLInformationTransfer message and extract the S1 setup response message from the second S1-AP message by removing the container for dedicated information of S1-AP message. By executing the above steps 401-431 the backhaul control communication method has created the backhaul link between the relay station and the base station on the control plane connection.

After the creation of the backhaul link over the control plane connection, the backhaul control communication method can enable the relay station to transmit all backhaul control messages to the core network through the base station via the backhaul link created on the control plane connection. When the relay station has to transmit a backhaul control message, steps 441-471 are executed to achieve that.

In step 441, the relay station adds a parameter of a container for dedicated information of S1-AP message in a dedicated-InformationType of the LTE standard.

Next, the backhaul control communication method executes step 443, 445, and 447 to enable the relay station to generate a backhaul control message, generate an uplink S1-AP control message carrying the backhaul control message by the container for dedicated information of S1-AP message, and generate an uplink control message carrying the uplink S1-AP control message by the ULInformationTransfer message. Next, the relay station executes step 449 to transmit the uplink control message.

Afterwards, the base station executes step 451 to receive the uplink control message. Steps 453 and 455 are executed respectively to enable the base station to extract the uplink S1-AP control message from the uplink control message by removing the ULInformationTransfer message and extract the backhaul control message from the uplink S1-AP control message by removing the container for dedicated information of S1-AP message.

Similarly, to carry to the backhaul control message, the base station executes steps 471, 457, 459, and 461 to respectively add a parameter of a container for dedicated information of S1-AP message in a dedicatedInformationType of the LTE standard, generate a backhaul control message, generate a downlink S1-AP control message carrying the backhaul control response message by the container for dedicated information of S1-AP message, and generate a downlink control message carrying the downlink S1-AP control message by the DLInformationTransfer message. Then, step 463 is executed by the base station to transmit the downlink control message.

Following that, the backhaul control communication method executes step 465 to enable the relay station to receive the downlink control message. Then, the relay station executes steps 467 and 469 to respectively extract the downlink S1-AP control message from the downlink control message by removing the DLInformationTransfer message and extract the backhaul control response message from the downlink S1-AP control message by removing the container for dedicated information of S1-AP message.

In addition to the aforementioned steps, the sixth example embodiment is able to execute all the operations and has all the functions of the first and second example embodiments. People skilled in the art can understand how the sixth example embodiment can achieve those operations and functions via the explanations of the first and second example embodiments.

A seventh example embodiment of the present invention is also a backhaul control communication method for a relay station in a wireless communication system conforming to the LTE standard. The difference between the seventh example embodiment and the sixth example embodiment is that the seventh example embodiment creates an X2 interface of the LTE standard instead of an S1 interface of the LTE standard.

Figure 5A:
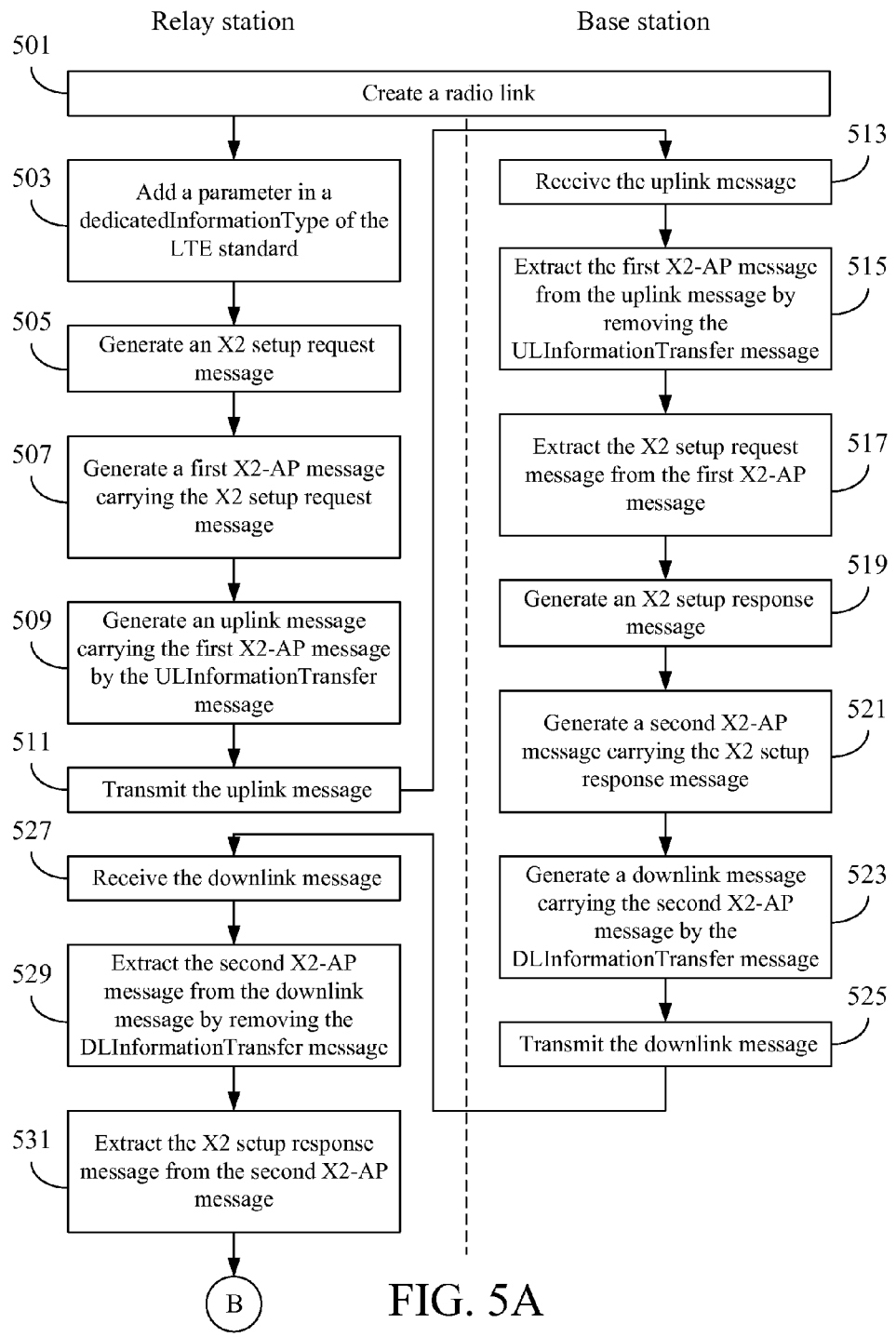
FIG. 5A, FIG. 5B, and FIG. 5C illustrate the flowchart of the backhaul control communication method of the seventh example embodiment.
Figure 5B:
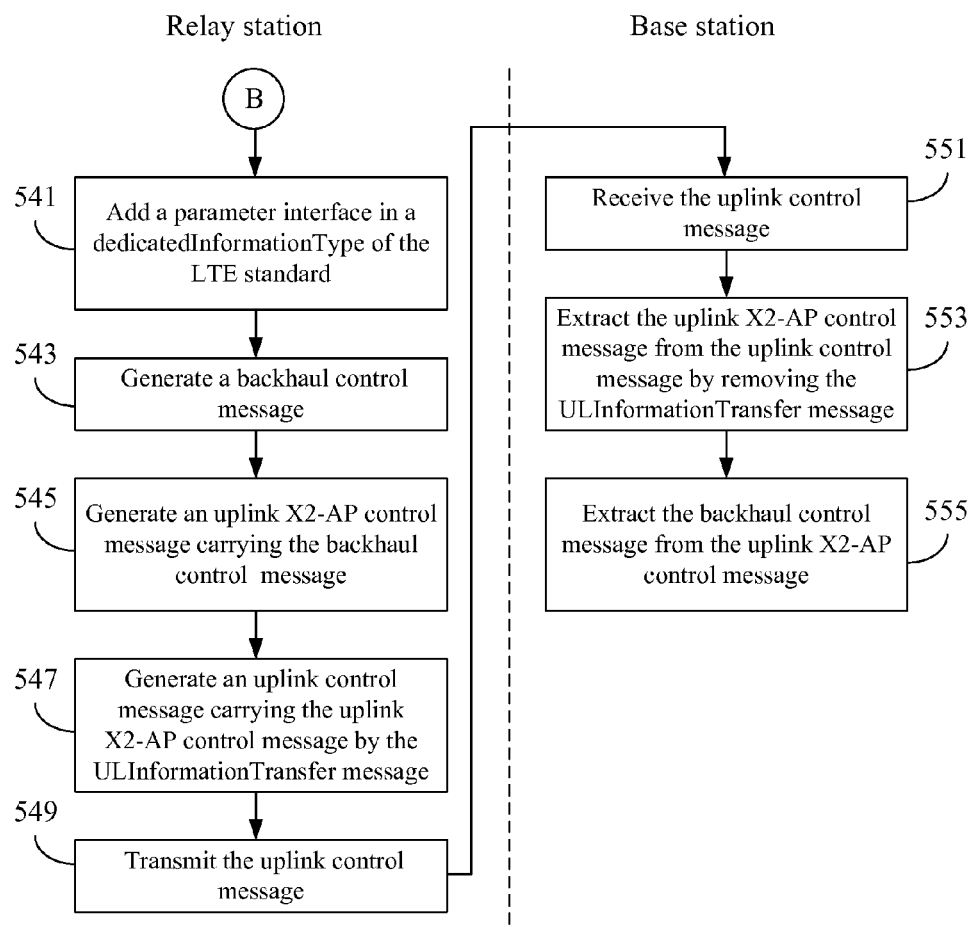
Figure 5C:
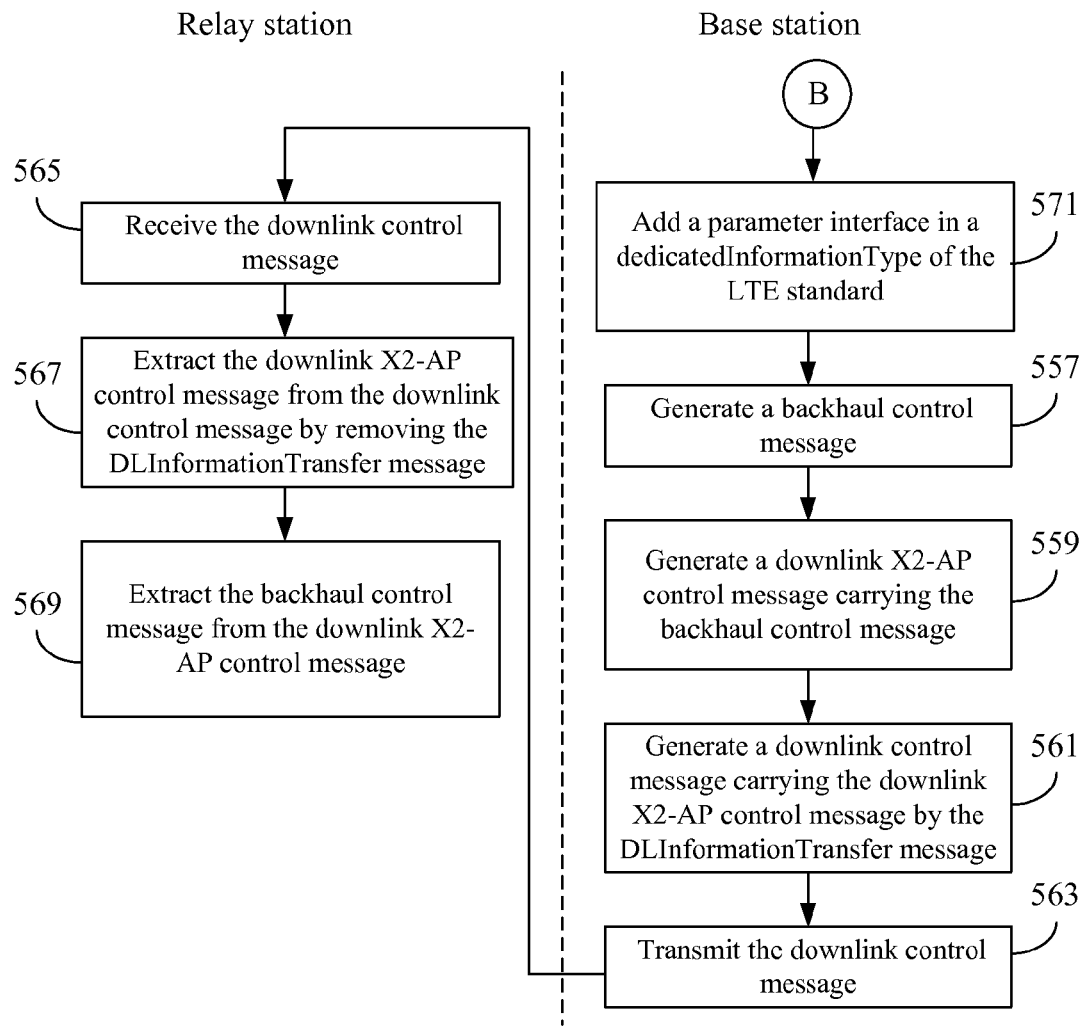

The flowchart of the backhaul control communication method is illustrated in FIG. 5A, FIG. 5B, and FIG. 5C. First, the backhaul control communication method executes step 501 to enable the relay station to create a radio link having a control plane connection between the relay station and the base station. It is assume that the wireless communication system conforms to the LTE standard in this example embodiment, so the relay station creates the radio link by creating a downlink path and an uplink path. To be more specific, the uplink path is a ULInformationTransfer message of the LTE standard, and the downlink path is a DLInformationTransfer message.

Next, the backhaul control communication enables the relay station to create a backhaul link between the relay station and the base station. Since the wireless communication system conforms to the LTE standard, the backhaul control communication method creates the backhaul link by creating an X2 interface of the LTE standard between the relay station and the base station. Particularly, the creation of the backhaul link may be achieved by the steps 503-531.

In step 503, the relay station adds a parameter of a container for dedicated information of X2-AP message in a dedicatedInformationType of the LTE standard. Next, steps 505, 507, and 509 are executed to respectively enable the relay station to generate an X2 setup request message, generate a first X2-AP message carrying the X2 setup request message by the container for dedicated information of X2-AP message, and generate an uplink message carrying the first X2-AP message by the ULInformationTransfer message. Following that, the backhaul control communication method executes step 511 to transmit the uplink message.

Afterwards, the backhaul control communication method enables the base station to executes step 513 to receive the uplink message. Next, the base station executes step 515 and 517 to respectively extract the first X2-AP message from the uplink message by removing the ULInformationTransfer message and extract the X2 setup request message from the first X2-AP message by removing the container for dedicated information of X2-AP message. Then, the base station executes steps 519, 521, and 523 respectively to generate an X2 setup response message, generate a second X2-AP message carrying the X2 setup response message by the container for dedicated information of X2-AP message, and generate a downlink message carrying the second X2-AP message by the DLInformationTransfer message. Next, the base station executes step 525 to transmit the downlink message.

Following that, the backhaul control message executes step 527 to enable the relay station to receive the downlink message. Then, the relay station executes step 529 and 531 to respectively extract the second X2-AP message from the downlink message by removing the DLInformationTransfer message and extract the X2 setup response message from the second X2-AP message by removing the container for dedicated information of X2-AP message. By executing the above steps 501-531 the backhaul control communication method has created the backhaul link between the relay station and the base station on the control plane connection.

After the creation of the backhaul link over the control plane connection, the backhaul control communication method can enable the relay station to transmit all backhaul control messages to the base station via the backhaul link created on the control plane connection. When the relay station has to transmit a backhaul control message, steps 541-571 are executed to achieve that.

In step 541, the relay station adds a parameter of a container for dedicated information of X2-AP message in a dedicatedInformationType of the LTE standard.

Next, the backhaul control communication method executes step 543, 545, and 547 to enable the relay station to generate a backhaul control message, generate an uplink X2-AP control message carrying the backhaul control message by the container for dedicated information of X2-AP message, and generate an uplink control message carrying the uplink X2-AP control message by the ULInformationTransfer message. Next, the relay station executes step 549 to transmit the uplink control message.

Afterwards, the base station executes step 551 to receive the uplink control message. Steps 553 and 555 are executed respectively to enable the base station to extract the uplink X2-AP control message from the uplink control message by removing the ULInformationTransfer message and extract the backhaul control message from the uplink X2-AP control message by removing the container for dedicated information of X2-AP message.

Similarly, to carry to the backhaul control message, the base station executes steps 571, 557, 559, and 561 to respectively add a parameter of a container for dedicated information of X2-AP message in a dedicatedInformationType of the LTE standard, generate a backhaul control message, generate a downlink X2-AP control message carrying the backhaul control response message by the container for dedicated information of X2-AP message, and generate a downlink control message carrying the downlink X2-AP control message by the DLInformationTransfer message. Then, step 563 is executed by the base station to transmit the downlink control message.

Following that, the backhaul control communication method executes step 565 to enable the relay station to receive the downlink control message. Then, the relay station executes steps 567 and 569 to respectively extract the downlink X2-AP control message from the downlink control message by removing the DLInformationTransfer message and extract the backhaul control response message from the downlink X2-AP control message by removing the container for dedicated information of X2-AP message.

In addition to the aforementioned steps, the seventh example embodiment is able to execute all the operations and has all the functions of the first and third example embodiments. People skilled in the art can understand how the seventh example embodiment can achieve those operations and functions via the explanations of the first and third example embodiments.

In other example embodiments, a backhaul control communication method can create both an S1 interface and an X2 interface of the LTE standard. The processes to create the S1 interface and the X2 interface are the same as the processes described in the sixth and seventh example embodiments, so the details are not repeated here. Likewise, after the creation of the backhaul link (comprising both the S1 interface and the X2 interface) over the control plane connection, the backhaul control communication method can enable the relay station to transmit all backhaul control messages to the core network or other base station through the base station via the backhaul link (comprising both the S1 interface and the X2 interface) built on the control plane connection. The processes of transmitting backhaul control messages by the S1 interface and the X2 interface of the backhaul link are the same as the processes described in the sixth and seventh example embodiments, so the details are not repeated here as well.

In addition, the downlink path created comprised in the radio link may be an RRCConnectionReconfiguration instead of the DLInformationTransfer in other example embodiments. For those cases, the RRCConnectionReconfiguration is revised by adding a container for dedicated information of X2-AP message, such as adding the dedicatedInfoX2AP as shown in the above Table 7.

The backhaul control communication method of the present invention can be applied to a relay station of a wireless communication system conforming to the IEEE 802.16m standard. In that case, the backhaul control communication method enables the relay station to create the radio link having a control plane connection and transmits all backhaul control messages within a container to the core network 27 via the backhaul link. Particularly, the container is the AAI_L2-XFER interface of the IEEE 802.16m standard.

In the present application, the words "first" and "second" in the terms "first S1-AP message" and "second S1-AP message" are only intended to express that the first S1-AP message and the second S1-AP message are different S1-AP messages, and the words "first" and "second" in the terms "first X2-AP message" and "second X2-AP message" are only intended to express that the first X2-AP message and the second X2-AP message are different X2-AP messages.

According to the above descriptions, the present invention creates a radio link having a control plane connection and then creates a backhaul link between the relay station and the base station by the control plane connection. By doing so, the present invention is able to transmit backhaul control messages via the backhaul link that is built on the control plane connection. Since all backhaul control messages are transmitted in the control plane connection, they are transmitted with less delay and higher security.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A backhaul control communication method for use in a relay station, a wireless communication system conforming to the LTE standard and comprising the relay station, a base station, and a core network, the relay station being wirelessly connected to the base station, the base station being wiredly connected to the core network, and the backhaul control communication method comprising the steps of:
    (a) enabling the relay station to create a radio link having a control plane connection between the relay station and the base station, comprising the steps of:
        (a1) enabling the relay station to create an uplink path between the relay station and the base station; and
        (a2) enabling the relay station to create a downlink path between the relay station and the base station;
    (b) enabling the relay station to creates a backhaul link by creating an X2 interface of the LTE standard upon the RRC layer and the PDCP layer and between the relay station and the base station by the control plane connection of the radio link, comprises the steps of:
        enabling the relay station to add a parameter related to a container for dedicated information of X2-AP message;
        enabling the relay station to generate an X2 setup request message;
        enabling the relay station to generate a first X2-AP message carrying the X2 setup request message by the container for dedicated information of X2-AP message;
        enabling the relay station to generate an uplink message carrying the first X2-AP message;
        enabling the relay station to transmit the uplink message;
        enabling the relay station to receive a downlink message from the base station;
        enabling the relay station to extract a second X2-AP message from the downlink message; and
        enabling the relay station to extract an X2 setup response message from the second X2-AP message by removing the container for dedicated information of X2-AP message; and
    (c) enabling the relay station to transmit or receive a backhaul control message within the container via the backhaul link,
    wherein the relay station is one of a relay node, a ReNB, and a relay eNB, the base station is a DeNB, and the core network is an EPC.

2. A relay station for use in a wireless communication system, the wireless communication system conforming to the LTE standard and comprising the relay station, a base station, and a core network, the relay station being wirelessly connected to the base station, the base station being wiredly connected to the core network, the relay station comprising:
    a transceiver; and
    a processing unit being configured to create a radio link having a control plane connection between the relay station and the base station by creating a downlink path and an uplink path between the relay station and the base station, wherein the processing unit adds a parameter related to a container for dedicated information of S1-AP message, generates an S1 setup request message, generates a first S1-AP message carrying the S1 setup request message by the container for dedicated information of S1-AP message, and generates an uplink message carrying the first S1-AP message, the transceiver transmits the uplink message and receives a downlink message from the base station, the processing unit extracts a second S1-AP message from the downlink message, and extracts an S1 setup response message from the second S1-AP message by removing the container for dedicated information of S1-AP message so as to creates a backhaul link that is an S1 interface of the LTE standard upon the RRC layer and the PDCP layer and between the relay station and the base station by the control plane connection of the radio link, wherein the transceiver is configured to transmit or receive a backhaul control message within the container via the backhaul link, wherein the relay station is one of a relay node, a ReNB, and a relay eNB, the base station is a DeNB, and the core network is an EPC.

3. The relay station of claim 2, wherein the uplink path is a ULInformationTransfer message of the LTE standard, the downlink path is a DLInformationTransfer message of the LTE standard, the parameter is added in a dedicatedInformationType of the LTE standard, the uplink message is the ULInformationTransfer message, and the second S1-AP message is extracted from the downlink message by removing the DLInformationTransfer message.

4. The relay station of claim 3, wherein the processing unit further adds the parameter in the dedicatedInformationType of the LTE standard, generates the backhaul control message, generates an uplink S1-AP control message carrying the backhaul control message by the container for dedicated information of S1-AP message, and generates an uplink control message carrying the uplink S1-AP control message by the ULInformationTransfer message, and the transceiver transmits the uplink control message; similarly, the transceiver receives a downlink control message from the base station, the processing unit further extracts a downlink S1-AP control message from the downlink control message by removing the DLInformationTransfer message, and the processing unit further extracts a backhaul control message from the downlink S1-AP control message by removing the container for dedicated information of S1-AP message.

5. A relay station for use in a wireless communication system, the wireless communication system conforming to the LTE standard and comprising the relay station, a base station, and a core network, the relay station being wirelessly connected to the base station, the base station being wiredly connected to the core network, the relay station comprising:
 a transceiver; and
 a processing unit being configured to create a radio link having a control plane connection between the relay station and the base station by creating a downlink path and an uplink path between the relay station and the base station, wherein the processing unit adds a parameter related to a container for dedicated information of X2-AP message generates an X2 setup request message, generates a first X2-AP message carrying the X2 setup request message by the container for dedicated information of X2-AP message, and generates an uplink message carrying the first X2-AP message, the transceiver transmits the uplink message and receives a downlink message from the base station, the processing unit extracts a second X2-AP message from the downlink message, and extracts an X2 setup response message from the second X2-AP message by removing the container for dedicated information of X2-AP message so as to create a backhaul link that is an X2 interface of the LTE standard upon the RRC layer and the PDCP layer and between the relay station and the base station by the control plane connection of the radio link, wherein the transceiver is configured to transmit or receive a backhaul control message within the container via the backhaul link, wherein the relay station is one of a relay node, a ReNB, and a relay eNB, the base station is a DeNB, and the core network is an EPC.

6. The relay station of claim 5, wherein the uplink path is a ULInformationTransfer message of the LTE standard, the downlink path is a DLInformationTransfer message of the LTE standard, the parameter is added in a dedicatedInformationType of the LTE standard, the uplink message is the ULInformationTransfer message, and the second X2-AP message is extracted from the downlink message by removing the DLInformationTransfer message.

7. The relay station of claim 6, wherein the processing unit further adds the parameter in the dedicatedInformationType of the LTE standard, generates the backhaul control message, generates an uplink X2-AP control message carrying the backhaul control message by the container for dedicated information of X2-AP message, generates an uplink control message carrying the uplink X2-AP control message by the ULInformationTransfer message and the transceiver transmits the uplink control message; similarly, the transceiver receives a downlink control message from the base station, the processing unit extracts a downlink X2-AP control message from the downlink control message by removing the DLInformationTransfer message, and the processing unit extracts a backhaul control message from the downlink X2-AP control message by removing the container for dedicated information of X2-AP message.

8. A backhaul control communication method for use in a base station, a wireless communication system conforming to the LTE standard and comprising the base station, a relay station, and a core network, the relay station being wirelessly connected to the base station, the base station being wiredly connected to the core network, and the backhaul control communication method comprising the steps of:
 (a) enabling the base station to create a radio link having a control plane connection between the relay station and the base station, comprising the steps of:
  (a1) enabling the base station to create an uplink path between the relay station and the base station; and
  (a2) enabling the base station to create a downlink path between the relay station and the base station;
 (b) enabling the base station to create a backhaul link by creating an S1 interface of the LTE standard upon the RRC layer and the PDCP layer and between the relay station and the base station by the control plane connection of the radio link, comprising, the steps of:
  enabling the base station to receive an uplink message;
  enabling the base station to extract a first S1-AP message from the uplink message;

enabling the base station to extract an S1 setup request message from the first S1-AP message by removing the container for dedicated information of S1-AP message;
enabling the base station to add a parameter related to a container for dedicated information of S1-AP message;
enabling the base station to generate an S1 setup response message;
enabling the base station to generate a second S1-AP message carrying the S1 setup response message by the container for dedicated information of S1-AP message;
enabling the base station to generate a downlink message carrying the second S1-AP message; and
enabling the base station to transmit the downlink message; and
(c) enabling the base station to receive a backhaul control message within the container from the relay station,
wherein the relay station is one of a relay node, a ReNB, and a relay eNB, the base station is a DeNB, and the core network is an EPC.

9. The backhaul control communication method of claim 8, wherein the uplink path is a ULInformationTransfer message of the LTE standard, the downlink path is a DLInformationTransfer message of the LTE standard, the first S1-AP message is extracted from the uplink message by removing the ULInformationTransfer message, the parameter is added in a dedicatedInformationType of the LTE standard, and the downlink message is the DLInformationTransfer message.

10. The backhaul control communication method of claim 9, wherein the step (c) comprises the steps of:
enabling the base station to receive an uplink control message;
enabling the base station to extract an uplink S1-AP control message from the uplink control message by removing the ULInformationTransfer message; and
enabling the base station to extract a backhaul control message from the uplink S1-AP control message by removing the container for dedicated information of S1-AP message; and
the backhaul control communication method further comprising the steps of:
enabling the base station to add the parameter in the dedicatedInformationType of the LTE standard;
enabling the base station to generate a backhaul control message;
enabling the base station to generate a downlink S1-AP control message carrying the backhaul control message by the container for dedicated information of S1-AP message;
enabling the base station to generate a downlink control message carrying the downlink S1-AP control message by the DLInformationTransfer message; and
enabling the base station to transmit the downlink control message.

11. A backhaul control communication method for use in a base station, a wireless communication system conforming to the LTE standard and comprising the base station, a relay station, and a core network, the relay station being wirelessly connected to the base station, the base station being wiredly connected to the core network, and the backhaul control communication method comprising the steps of:
(a) enabling the base station to create a radio link having a control plane connection between the relay station and the base station, comprising the steps of:
(a1) enabling the base station to create an uplink path between the relay station and the base station; and
(a2) enabling the base station to create a downlink path between the relay station and the base station;
(b) enabling the base station to creates a backhaul link by creating an X2 interface of the LTE standard upon the RRC layer and the PDCP layer and between the relay station and the base station by the control plane connection of the radio link, comprising the steps of:
enabling the base station to receive an uplink message;
enabling the base station to extract a first X2-AP message;
enabling the base station to extract an X2 setup request message from the first X2-AP message by removing the container for dedicated information of X2-AP message;
enabling the base station to add a parameter related to a container for dedicated information of X2-AP message;
enabling the base station to generate an X2 setup response message;
enabling the base station to generate a second X2-AP message carrying the X2 setup response message by the container for dedicated information of X2-AP message;
enabling the base station to generate a downlink message carrying the second X2-AP message; and
enabling the base station to transmit the downlink message; and
(c) enabling the base station to receive a backhaul control message within the container from the relay station,
wherein the relay station is one of a relay node, a ReNB, and a relay eNB, the base station is a DeNB, and the core network is an EPC.

12. The backhaul control communication method of claim 11, wherein the uplink path is a ULInformationTransfer message of the LTE standard, the downlink path is a DLInformationTransfer message of the LTE standard, the first X2-AP message is extracted by removing the ULInformationTransfer message, the parameter is added in a dedicatedInformationType of the LTE standard, and the downlink message is the DLInformationTransfer message.

13. The backhaul control communication method of claim 12, wherein the step (c) comprises the steps of:
enabling the base station to receive an uplink control message;
enabling the base station to extract an uplink X2-AP control message from the uplink control message by removing the ULInformationTransfer message; and
enabling the base station to extract a backhaul control message from the uplink X2-AP control message by removing the container for dedicated information of X2-AP message; and
the backhaul control communication method further comprising the steps of:
enabling the base station to add the parameter in the dedicatedInformationType of the LTE standard;
enabling the base station to generate a backhaul control message;
enabling the base station to generate a downlink X2-AP control message carrying the backhaul control message by the container for dedicated information of X2-AP message;
enabling the base station to generate a downlink control message carrying the downlink X2-AP control message by the DLInformationTransfer message; and
enabling the base station to transmit the downlink control message.

14. A base station for use in a wireless communication system, the wireless communication system comprising a relay station, the base station, and a core network, the relay station being wirelessly connected to the base station, the base station being wiredly connected to the core network, the base station comprising:
- a transceiver; and
- a processing unit being configured to create a radio link having a control plane connection between the relay station and the base station by creating a downlink path and an uplink path between the relay station and the base station,
- wherein the transceiver receives an uplink message, the processing unit extracts a first S1-AP message from the uplink message, extracts an S1 setup request message from the first S1-AP message by removing the container for dedicated information of S1-AP message, adds a parameter related to a container for dedicated information of S1-AP message, generates an S1 setup response message, generates a second S1-AP message carrying the S1 setup response message by the container for dedicated information of S1-AP message, and generates a downlink message carrying the second S1-AP message and the transceiver transmits the downlink message so as to create a backhaul link that is an S1 interface of the LTE standard upon the RRC layer and the PDCP layer and between the relay station and the base station by the control plane connection of the radio link,
- wherein the transceiver further receive a backhaul control message within the container from the relay station,
- wherein the relay station is one of a relay node, a ReNB, and a relay eNB, the base station is a DeNB, and the core network is an EPC.

15. The base station of claim 14, wherein the uplink path is a ULInformationTransfer message of the LTE standard, the downlink path is a DLInformationTransfer message of the LTE standard, the first S1-AP message is extracted from the uplink message by removing the ULInformationTransfer message, the parameter is added in a dedicatedInformationType of the LTE standard, and the downlink message is the DLInformationTransfer message.

16. The base station of claim 15, wherein the transceiver receives an uplink control message, the processing unit extracts an uplink S1-AP control message from the uplink control message by removing the ULInformationTransfer message, and the processing unit extracts a backhaul control message from the uplink S1-AP control message by removing the container for dedicated information of S1-AP message; similarly, the processing unit adds the parameter in the dedicatedInformationType of the LTE standard, generates a backhaul control message, generates a downlink S1-AP control message carrying the backhaul control message by the container for dedicated information of S1-AP message, and generates a downlink control message carrying the downlink S1-AP control message by the DLInformationTransfer message, and the transceiver transmits the downlink control message.

17. A base station for use in a wireless communication system, the wireless communication system comprising a relay station, the base station, and a core network, the relay station being wirelessly connected to the base station, the base station being wiredly connected to the core network, the base station comprising:
- a transceiver; and
- a processing unit being configured to create a radio link having a control plane connection between the relay station and the base station by creating a downlink path and an uplink path between the relay station and the base station,
- wherein the transceiver receives an uplink message, the processing unit extracts a first X2-AP message from the uplink message, extracts an X2 setup request message from the first X2-AP message by removing the container for dedicated information of X2-AP message, adds a parameter related to a container for dedicated information of X2-AP message, generates an X2 setup response message, generates a second X2-AP message carrying the X2 setup response message by the container for dedicated information of X2-AP message, and generates a downlink message carrying the second X2-AP message by the and the transceiver transmits the downlink message so as to create a backhaul link that is an X2 interface of the LTE standard upon the RRC layer and the PDCP layer and between the relay station and the base station by the control plane connection of the radio link,
- wherein the transceiver further receive a backhaul control message within the container from the relay station,
- wherein the relay station is one of a relay node, a ReNB, and a relay eNB, the base station is a DeNB, and the core network is an EPC.

18. The base station of claim 17, wherein the uplink path is a ULInformationTransfer message of the LTE standard, the downlink path is a DLInformationTransfer message of the LTE standard, the first X2-AP message is extracted by removing the ULInformationTransfer message, the parameter is added in a dedicatedInformationType of the LTE standard, and the downlink message is the DLInformationTransfer message.

19. The base station of claim 18, wherein the transceiver receives an uplink control message, the processing unit extracts an uplink X2-AP control message from the uplink control message by removing the ULInformationTransfer message, and the processing unit extracts a backhaul control message from the uplink X2-AP control message by removing the container for dedicated information of X2-AP message; similarly, the processing unit adds the parameter in the dedicatedInformationType of the LTE standard, generates a backhaul control message, generates a downlink X2-AP control message carrying the backhaul control message by the container for dedicated information of X2-AP message, and generates a downlink control message carrying the downlink X2-AP control message by the DLInformationTransfer message, and the transceiver transmits the downlink control message.

20. A backhaul control communication method for use in a relay station, a wireless communication system conforming to the LTE standard and comprising the relay station, a base station, and a core network, the relay station being wirelessly connected to the base station, the base station being wiredly connected to the core network, and the backhaul control communication method comprising the steps of:
- (a) enabling the relay station to create a radio link having a control plane connection between the relay station and the base station, comprising the steps of:
  - (a1) enabling the relay station to create an uplink path between the relay station and the base station; and
  - (a2) enabling the relay station to create a downlink path between the relay station and the base station;
- (b) enabling the relay station to create a backhaul link by creating an S1 interface of the LTE standard upon the radio resource control (RRC) layer and the packet data convergence protocol (PDCP) layer and between the relay station and the base station by the control plane connection of the radio link, comprising the steps of:
  - enabling the relay station to add a parameter related to a container for dedicated information of S1-AP message;

enabling the relay station to generate an S1 setup request message;

enabling the relay station to generate a first S1-AP message carrying the S1 setup request message by the container for dedicated information of S1-AP message;

enabling the relay station to generate an uplink message carrying the first S1-AP message;

enabling the relay station to transmit the uplink message;

enabling the relay station to receive a downlink message from the base station;

enabling the relay station to extract a second S1-AP message from the downlink message; and enabling the relay station to extract an S1 setup response message from the second S1-AP message by removing the container for dedicated information of S1-AP message; and (c) enabling the relay station to transmit or receive a backhaul control message within the container via the backhaul link, wherein the relay station is one of a relay node, a Relay E-UTRAN NodeB (ReNB), and a relay eNB, the base station is a Doner E-UTRAN NodeB (DeNB), and the core network is an Evolved Packet Core (EPC).

21. The backhaul control communication method of claim 20, wherein the uplink path is a ULInformationTransfer message of the LTE standard, the downlink path is a DLInformationTransfer message of the LTE standard, the parameter is added in a dedicatedInformationType of the LTE standard, the uplink message is the ULInformationTransfer message, and the second S1-AP message is extracted from the downlink message by removing the DLInformationTransfer message.

22. The backhaul control communication method of claim 21, wherein the step (c) comprises the steps of:

enabling the relay station to add the parameter in the dedicatedInformationType of the LTE standard;

enabling the relay station to generate the backhaul control message;

enabling the relay station to generate an uplink S1-AP control message carrying the backhaul control message by the container for dedicated information of S1-AP message;

enabling the relay station to generate an uplink control message carrying the uplink S1-AP control message by the ULInformationTransfer message; and enabling the relay station to transmit the uplink control message; and the backhaul control communication method further comprising the steps of:

enabling the relay station to receive a downlink control message from the base station;

enabling the relay station to extract a downlink S1-AP control message from the downlink control message by removing the DLInformationTransfer message; and enabling the relay station to extract a backhaul control response message from the downlink S1-AP control message by removing the container for dedicated information of S1-AP message.

23. The backhaul control communication method of claim 1, wherein the uplink path is a ULInformationTransfer message of the LTE standard, the downlink path is a DLInformationTransfer message of the LTE standard, the parameter is added in a dedicatedInformationType of the LTE standard, the uplink message is the ULInformationTransfer message, and the second X2-AP message is extracted from the downlink message by removing the DLInformationTransfer message.

24. The backhaul control communication method of claim 23, wherein the step (c) comprises the steps of:

enabling the relay station to add the parameter in the dedicatedInformationType of the LTE standard;

enabling the relay station to generate the backhaul control message;

enabling the relay station to generate an uplink X2-AP control message carrying the backhaul control message by the container for dedicated information of X2-AP message;

enabling the relay station to generate an uplink control message carrying the uplink X2-AP control message by the ULInformationTransfer message; and enabling the relay station to transmit the uplink control message; and the backhaul control communication method further comprising the following steps of:

enabling the relay station to receive a downlink control message from the base station;

enabling the relay station to extract a downlink X2-AP control message from the downlink control message by removing the DLInformationTransfer message; and enabling the relay station to extract a backhaul control response message from the downlink X2-AP control message by removing the container for dedicated information of X2-AP message.

* * * * *